(12) United States Patent
Bouquet et al.

(10) Patent No.: US 6,270,061 B1
(45) Date of Patent: Aug. 7, 2001

(54) DEVICE FOR AGITATING A LIQUID IN A REACTOR AND FOR INJECTING A GAS INTO THIS LIQUID

(75) Inventors: Florent Bouquet, Vulaines sur Seine; Frédérique Ferrand; Florence Gouhinec, both of Versailles, all of (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/412,570

(22) Filed: Oct. 5, 1999

(30) Foreign Application Priority Data

Oct. 9, 1998 (FR) .................................................. 98 12696

(51) Int. Cl.$^7$ ......................................................... B01F 3/04
(52) U.S. Cl. .............................................. 261/87; 261/93
(58) Field of Search ................................. 261/85, 87, 93, 261/91, DIG. 71

(56) References Cited

U.S. PATENT DOCUMENTS

| | | | | |
|---|---|---|---|---|
| 2,875,897 | * | 3/1959 | Booth | 261/87 |
| 2,928,661 | * | 3/1960 | MaClaren | 261/87 |
| 3,092,678 | * | 6/1963 | Braun | 261/87 |
| 3,650,950 | * | 3/1972 | White | 261/87 |
| 3,776,531 | * | 12/1973 | Ebner et al. | 261/87 |
| 3,972,815 | * | 8/1976 | O'Cheskey et al. | 261/93 |
| 4,290,885 | * | 9/1981 | Kwak | 261/87 |
| 4,297,214 | * | 10/1981 | Guarnaschelli | 261/87 |
| 5,795,504 | * | 8/1998 | Berchotteau | 261/85 |
| 6,109,449 | * | 8/2000 | Howk et al. | 261/93 |

FOREIGN PATENT DOCUMENTS

| | | |
|---|---|---|
| 0 446 192 | 9/1991 | (EP) . |
| 0 583 509 | 2/1994 | (EP) . |
| 0 593 074 | 4/1994 | (EP) . |
| 7304539 | 10/1974 | (NL) . |

* cited by examiner

Primary Examiner—C. Scott Bushey
(74) Attorney, Agent, or Firm—Burns, Doane, Swecker & Mathis, L.L.P.

(57) ABSTRACT

This device includes a drive device (1) arranged above the reactor, provided with a vertical output shaft (2) equipped at its end with an axial-flow mobile assembly such as a propeller (4) immersed in the reactor; the output shaft of the drive device also carries an auto-suction turbine (5) immersed in the reactor and drivable by the output shaft (2), and the latter is enveloped coaxially by a cylinder (6) linked at its upper end to the drive device and whose lower end (6a) opens out into the turbine; in the upper end of the cylinder is drilled an aperture (14) for injecting a gas into an annular gap (15) delimited by the shaft and the cylinder. This device makes it possible to transfer a gas into a liquid efficiently and to ensure agitation whereby particles may be placed in suspension and held there. Application to the biological treatment of industrial effluents.

12 Claims, 3 Drawing Sheets

DEVICE FOR AGITATING A LIQUID IN A REACTOR AND FOR INJECTING A GAS INTO THIS LIQUID

This application claims priority under 35 U.S.C. §§119 and/or 365 to 98 12696 filed in France on Oct. 9, 1998; the entire content of which is hereby incorporated by reference.

BACKGROUND OF THE INVENTION

1. Field of the Invention

The subject of the present invention is a device for agitating a liquid in a reactor and for injecting a gas into this liquid, comprising a drive device arranged above the reactor, provided with a vertical output shaft equipped at its end with at least one axial-flow mobile assembly immersed in the liquid.

2. Description of the Related Art

The gas injected into the liquid can be either an oxygenated gas with a proportion of oxygen varying from 20 to 100%, or carbon dioxide, or an ozonized gas, or a biogas etc. The liquid into which the gas is to be injected is arranged in reactors used in particular for the biological treatment of industrial effluents and whose height generally varies from 2 to 10 meters in depth.

In what follows "reactor" signifies both a natural "basin" (lagoon, pond, lake etc.) and also an enclosed or open headspace "tank" whose walls may be relatively close together or far apart. The reactors into which these systems enable gases to be injected generally contain activated sludges. These reactors may therefore be either natural basins, or open headspace reactors with closely spaced walls, or enclosed reactors, which may or may not be pressurized.

In the field of the biological treatment of water, various types of systems are known depending on whether the gas is injected at the surface, or at the bottom of the basin. For example, there are surface turbines, brushes enabling air to be transferred into the liquid by creating agitation. Such devices can only be used for small heights of water and have limited oxygenation capacities.

Thus Patent EP-0 583 509 from PRAXAIR Technology Inc. describes a system characterized chiefly by a propeller situated in a hollow shaft and entraining, during its rotation and by vortex effect from the surface of the liquid, gas and liquid located under an immersed cover. The gas/liquid mixture thus formed is propelled downwards. The gas bubbles being undissolved rise within a radius of action corresponding overall to that of the cover where they are collected so as to be reinjected again. The inputting of feed gas and venting, as well as the optimal level of the liquid in the cover, are regulated by the pressure prevailing under the cover.

Although the stated transfer efficiencies are very good, the limits of this system are chiefly:
- the zone of action limited to a radius much like that of the cover and to a relatively small depth of water,
- the enrichment of the gaseous phase with CO2, N2 and other gases arising from the biological activity, in the case of activated sludge applications, and the need to carry out venting causing losses of O2,
- the complexity of the pressure regulation under the cover,
- use of a gas at high pressure: need to use a booster following a VSA or MPSA (on-site production unit operating by adsorption under pressure or with vacuum regeneration).

Porous "bottom" systems with injection of gas and agitation means are also known. These systems have a fixed and limited oxygenation capacity, and tend to clog. Finally, there are other "bottom" devices comprising jets or the device known by the brand name "Ventoxal" with injection of gas (oxygen-enriched air, or pure oxygen). The "Ventoxal" system developed by the applicant consists of a pump, a Venturi type injection system, a flow distributor and an ejector/nozzle pair, for which the gas injection pressure depends on the height of water and remains chiefly greater than 1.5 bar absolute. The agitation obtained is satisfactory in the bottom of the basin but may be average in the remainder of the volume.

SUMMARY OF THE INVENTION

The purpose of the invention is to propose a device for agitating a liquid and for injecting a gas into this liquid, of the type mentioned above, making it possible efficiently to transfer a gas into a liquid and to ensure agitation enabling particles to be placed in suspension and held there.

In accordance with the invention, the output shaft of the drive device also carries an auto-suction turbine immersed in the liquid and drivable by the output shaft, and the latter is enveloped coaxially by a cylinder linked at its upper end to the drive device and whose lower end opens out into the turbine; in the upper end of the cylinder is drilled an aperture for injecting a gas into an annular gap delimited by the shaft and the cylinder.

The output shaft of the drive device drives the turbine and the propeller at the same speed.

The rotation of the turbine causes gas to be sucked through the hollow cylinder enveloping the output shaft of the drive device. This turbine propels the gas/liquid dispersion radially.

The device comprises means for directing towards the propeller the gas/liquid dispersion expelled radially by the turbine.

According to one embodiment of the invention, the said means comprise an annular box forming a deflector, enveloping the turbine and profiled so as to direct towards the propeller the stream issuing radially from the turbine, and a set of substantially vertical plates forming counter-blades, arranged radially and fixed to the deflector.

Advantageously, the said means may comprise an additional agitation mobile assembly preferably driven in rotation by the output shaft, or any other means, preferably at the same speed of rotation as the shaft.

The deflector which envelopes the turbine pushes the gas/liquid dispersion down towards the propeller which propels gas bubbles towards the bottom, and creates a stream of pumping liquid allowing agitation of the basin. The counter-blades make it possible to direct the various liquid and gaseous streams so as to maximize the performance in terms of transfer and agitation.

BRIEF DESCRIPTION OF THE FIGURES OF THE DRAWING

The invention will now be described with reference to the appended drawing which illustrates an embodiment thereof by way of nonlimiting example.

DETAILED DESCRIPTION OF THE PREFERRED EMBODIMENTS

Figure 1:
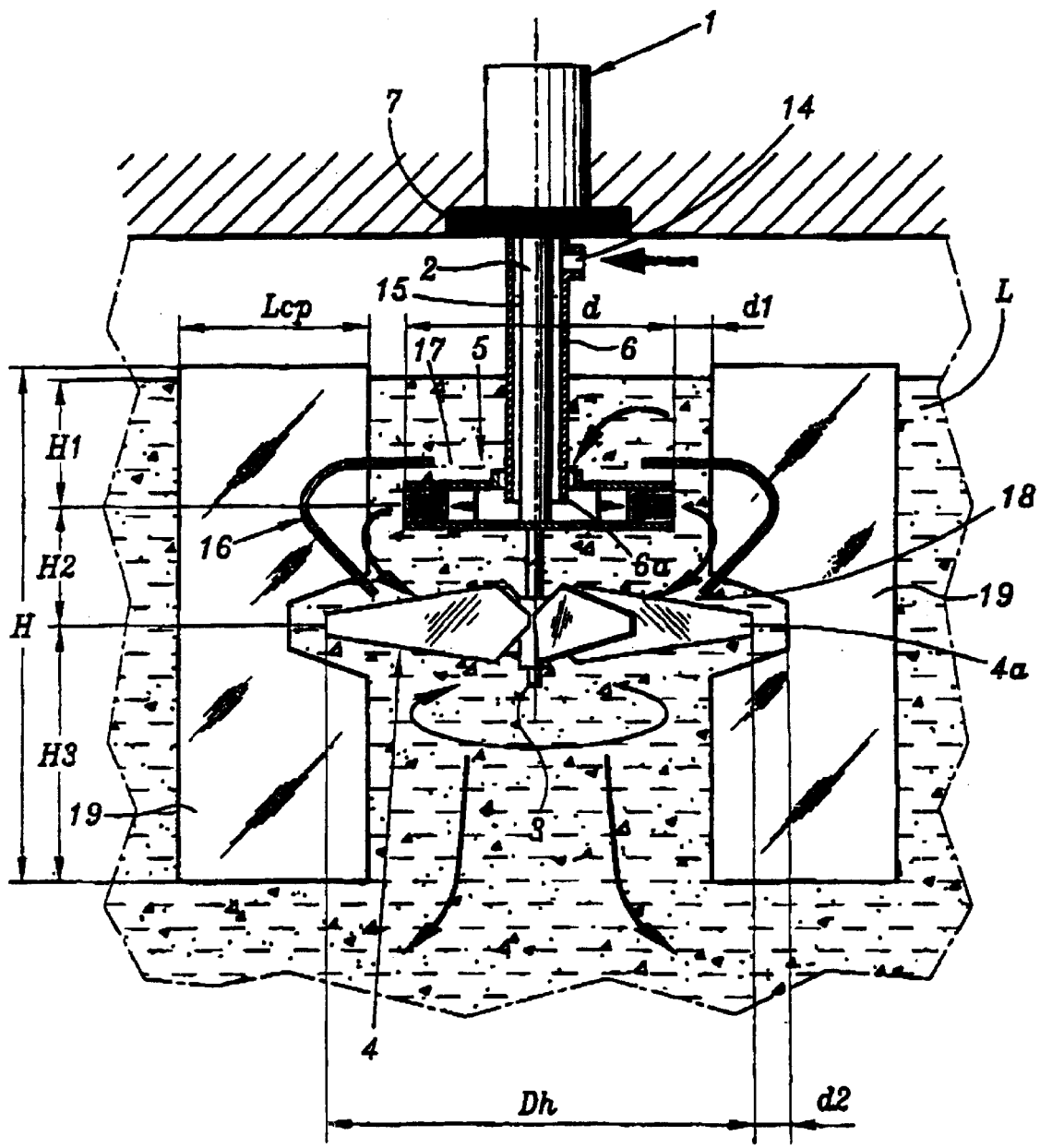
FIG. 1 is a vertical axial sectional view of an embodiment of the device for agitating liquid and injecting gas into this liquid in accordance with the invention.

The device represented in the drawings is intended to allow the agitation of a liquid L in a reactor as well as the injection of a gas into this liquid, this gas being preferably, but not exclusively, oxygenated.

The device comprises a drive device 1, for example a motor, arranged above the surface of the liquid L, provided with a rotary output shaft 2 extending vertically and partially immersed in the liquid L. The output shaft 2 is equipped at its lower end 3 with a propeller 4 immersed in the liquid L. The shaft 2 also carries, arranged between the propeller 4 and the surface of the liquid L, an auto-suction turbine 5 which is consequently immersed in the reactor and can be driven by the output shaft 2 at the same speed as the propeller 4. The output shaft 2 is enveloped coaxially by a cylinder 6 linked at its upper end to the drive device 1, with interposition of a leakproofing device 7 known per se, and whose lower end 6a opens out into the turbine 5 coaxially with the shaft 2.

The auto-suction turbine 5 consists of two superposed discs 8, 9 placed horizontally, and of a set of radial vanes 11 placed between the discs 8, 9 and fixed to them. Made in the upper disc 8 is a central hole 12 delimited by a projecting collar, and into which hole the lower end 6a of the cylinder 6 penetrates, hence delimiting together with the edge of the said hole 12 an annular space 13.

In the upper end of the cylinder 6 is drilled an aperture 14 for injecting a gas into the annular gap 15 delimited by the shaft 2 and by the cylinder 6. The system for injecting gas into the orifice 14 is known per se and not represented.

The output shaft 2 passes axially through the discs 8 and 9 while being fixed to the lower disc 9, so that when the drive device 1 is actuated, the shaft 2 drives the turbine 5 and the propeller 4 in rotation at the same speed. The rotation of the turbine 5 creates the suction of the gas arriving through the orifice 14, by way of the cylinder 6, as well as the suction of part of the liquid which is introduced through the annular gap 13 left free between the turbine 5 and the cylinder 6. This gas/liquid dispersion is manifested as a population of bubbles whose size is mainly between 100 $\mu$m and 2 mm.

The device also comprises means for directing towards the propeller 4 the gas/liquid dispersion expelled radially by the turbine 5 between its vanes 11. In the embodiment described, these means comprise an annular box 16 forming a deflector, drilled with two superposed central apertures 17, 18 coaxial with the shaft 2, the diameter of the lower aperture 18 being substantially greater than that of the upper aperture 17 and substantially equal to that (d) of the turbine 5.

The means for directing towards the propeller 4 the gas/liquid dispersion also comprise a set of substantially vertical plates 19 forming counter-blades, arranged radially around a deflector box 16 and fixed to the latter. For this purpose, each counter-blade 19 penetrates radially over a certain distance inside the deflector box 16, to which it is fixed by appropriate means known per se, for example welding or riveting. The counter-blades 19 can be arranged around the turbine 5 and the propeller 4 in appropriate number at specified angular intervals. A notch 21 into which may penetrate ends of the blades of the propeller 4 is cut into the interior edge of each counter-blade 19, at the level of the propeller 4.

The counter-blades 19 extend vertically from a level corresponding substantially to that of the liquid L, over a total height H of between 0.7 times and 12 times the diameter d of the turbine 5 (FIG. 1).

The device for agitating the liquid and for injecting gas into this liquid which has just been described operates as follows.

Once the drive device 1 has been switched on, the output shaft 2 drives the auto-suction turbine 5 and the terminal propeller 4 in rotation at the same speed. The gas is injected or sucked through the aperture 14 into the annular gap 15 from where it is sucked towards the turbine 5, as is part of the liquid L in the annular gap 13 between the upper plate 8 and the cylinder 6 (as indicated by the arrow in FIG. 1). At least 90% of the dispersion of bubbles is recovered by virtue of the presence of the counter-blades 19 and of the deflector 16 which directs the stream towards the propeller 4, as indicated by the two lateral arrows in FIG. 1. The propeller 4, consisting of at least two blades 4a, propels the dispersion of bubbles at a speed of between for example 1 and 5 m/second towards the bottom of the basin. The dimensioning and the operating conditions applied may enable the bubbles to be propelled to a depth of 10 meters whilst preserving a horizontal speed at the floor which is sufficient (that is to say greater than 0.1 m/s) to prevent or warn of the formation of zones of deposits or of solid particles on the bottom of the basin.

The bubbles thrown to the bottom of the basin subsequently rise at the periphery of the agitation mobile assembly (4, 5) around the central axis 2. The residence time of the gas bubbles in the liquid is sufficient to ensure the transfer of oxygen from the gas phase (if the gas injected is oxygenated) to the liquid phase. The oxygen can thus be used for the purposes of biomass respiration or oxygenation of certain compounds.

The pumping flow induced by the presence of the recouping propeller 4 and of the counter-blades 19 makes it possible to ensure the churning of the liquid volume around the agitation mobile assembly 4 within a radius which depends on the power dissipated by the propeller 4 (power of between 40 and 90% of the power applied to the motor shaft 2). This churning enables the sludges and/or solid particles to be placed in suspension so as to ensure that the concentration of sludges and/or of particles in all the volumes churned by the propeller 4 is rendered homogeneous.

When the gas injected through the orifice 14 is oxygenated, the device described above makes it possible to carry out biological treatment of industrial or urban effluents, by transferring the oxygen to the activated sludge and by agitating the biomass so as to render the concentration of sludges homogeneous. The deflector 16 which envelopes the turbine 5 pushes the gas/liquid dispersion down towards the propeller 4 which propels the gas bubbles towards the bottom of the reactor, and creates a liquid pumping flow allowing agitation of the reactor. The counter-blades 19 make it possible to direct the various liquid and gaseous streams so as to maximize the performance in terms of transfer and agitation.

Example of Implementation of the Device

Dimensioning of the Turbine 5

The extrapolation and dimensioning criteria for the turbine 5, after optimization trials, are the following (FIG. 1):

H1=0.1 to 5d (d being the diameter of the turbine 5)

H2=0.5 to 2d

H3=0.1 to 5d d1=0.01 to 0.1*d (d1 is the radial distance between the turbine 5 and each counter-blade 19)

d2=0.01 to 0.1*d (d2 is the radial distance between the bottom of a notch 21 and the ends of the blades 4*a*)

Lcp=0.5 to 2*d (Lcp is the width of each counter-blade)

Dh=1 to 2*d (Dh=diameter of the propeller 4)

The counter-blades 19, four in number in the example illustrated in the drawings, are oriented radially with respect to the axis of the turbine. They are at least two, the contour of which hugs the geometrical shape of the rotor (propeller).

The counter-blades have been added so as to transform the tangential stream into an axial stream oriented towards the bottom of the vessel. Their number has been defined experimentally with the aim of distributing over the entire circumference the zones of Gas/Liquid dispersion rising towards the surface.

These counter-blades start from the surface of the liquid, and may advantageously descend down to a depth equal to at most 12 times the diameter of the turbine. Their positioning with respect to the surface is necessary so as to avoid the formation of a vortex which would lead to the shutting down of the turbine.

In respect of the propeller for recovering the Gas/Liquid dispersion, the number of blades 4*a* varies from 2 to 12. It is defined in such a way as to limit the risks of choking with respect to the operating range of the turbine in terms of Gas/Liquid ratio.

Figure 2:
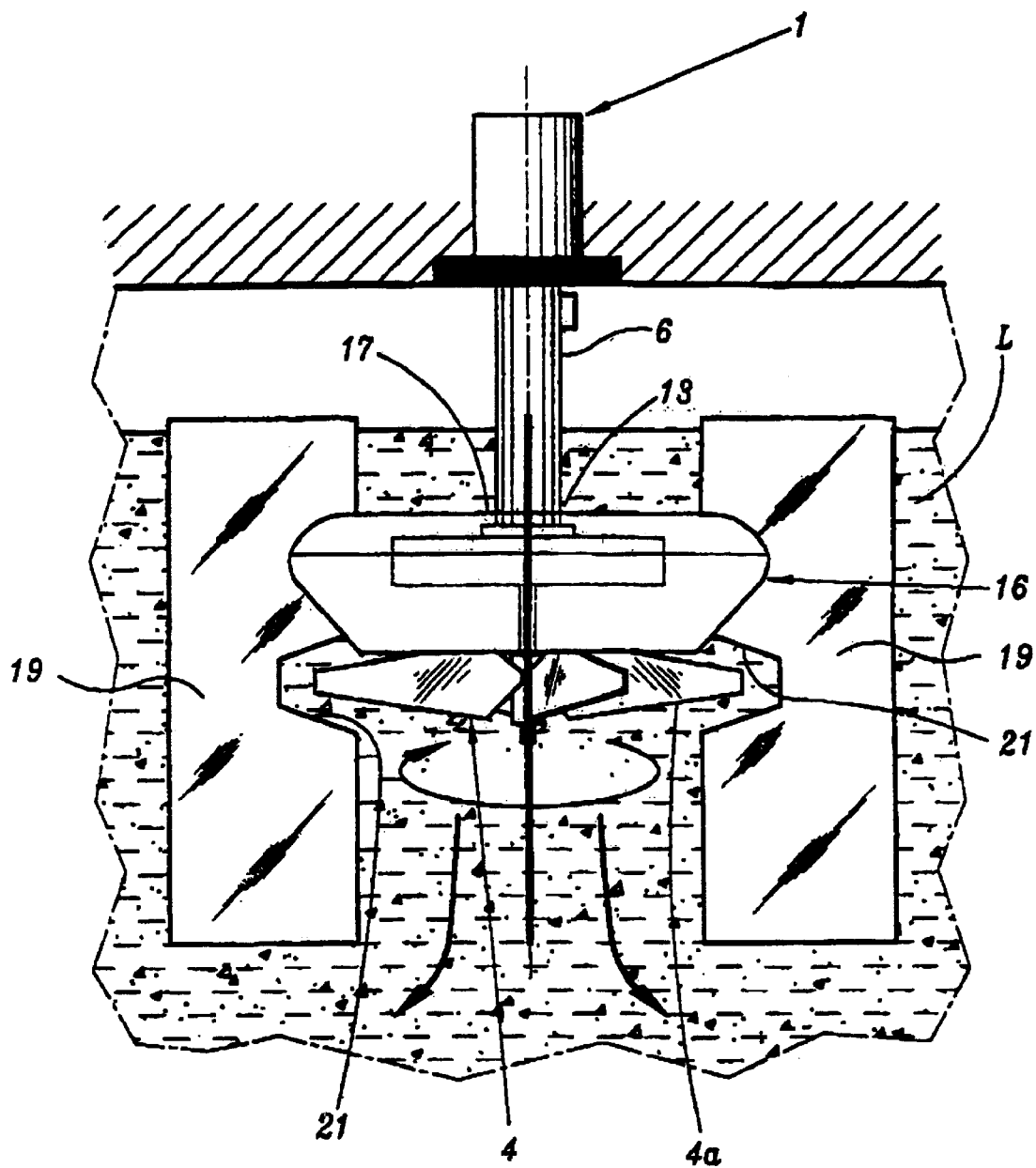
FIG. 2 is an elevational view of the device of FIG. 1 showing in particular the deflector containing the turbine, as well as, chain-dotted, a variant embodiment.
Figure 3:
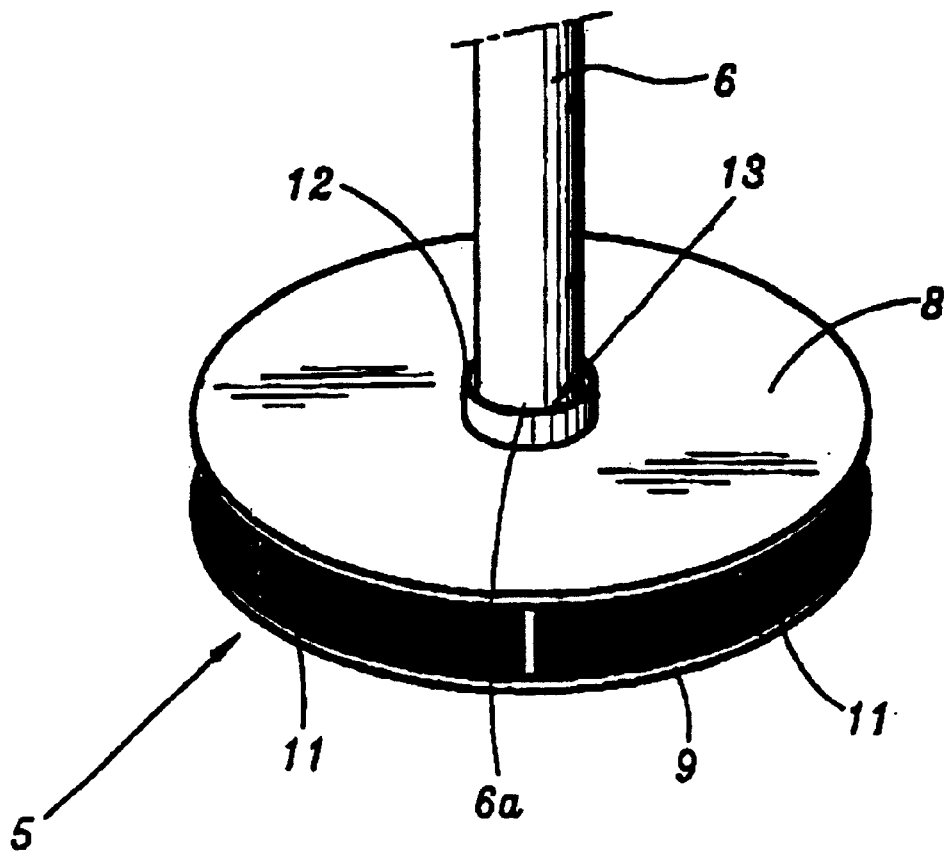
FIG. 3 is a perspective view representing the auto-suction turbine arranged in the deflector of the device of FIGS. 1 and 2.

The rate of recovery of the gas/liquid dispersion can advantageously be increased by adding an additional mobile assembly 22 (FIG. 2), for example a propeller with two or more blades. This mobile assembly 22 can be fixed to the output shaft 2 as represented, and makes it possible to increase the peripheral speed of the liquid in the annular box.

The operating parameters of the turbine are:

the immersion I which is the distance between the level of the liquid and the upper disc of the turbine.

the speed of rotation N the gas flow rate Qg the gas injection pressure Pg

The extrapolation criteria for these operating parameters are the following:

I/d from 0.01 to 5: nominal value=0.4

Modified Froude number=$Fr^* = N^2 * d^2 / g * I$ =inertial forces/gravity forces $Fr^*$=from 0.1 to 25: nominal value=1.1 to 2.5

$Fr^* < 0.1$ =>very weak gas suction $Fr^* > 24$ =>risk of choking

Power consumed=$N^3 * d^5 * Np$ with Np power number=$f(Fr^*)$

The modes for running the device which are addressed by the invention may be the following:

Continuous Operation:

operation at fixed speed of rotation, regulation of the gas flow rate being effected by a flow rate control member placed on the fluid line, operation at variable speed and variable gas flow rate so that the optimal conditions of operation of the turbine always hold.

Alternating/Sequenced Operation:

Operating in cycles by alternating phases of agitation with injection of gas and phases of agitation without injection of gas, and/or alternating phases of agitation with variable speeds. Such operation finds its full justification and interest in particular in respect of single-basin nitrification/denitrification.

The ranges of operating conditions are the following:

The net specific inputs (NSI) measured in KgO2/kWh absorbed may vary from 0.5 to 8.

The suction capacity of the turbine 5 may reach 50 Nm3/h of gas per kWh consumed by this turbine.

The agitation speeds are from around 50 to 1000 rev/min.

The immersion/diameter ratio of the turbine 5 varies from 0.01 to 5.

The modified Froude number is between substantially 0.1 and 25

The height of water in the basin may conventionally be between 2 and 10 m.

The dissipated power ratio between the propeller 4 and the turbine 5 may vary from 40/60 to 90/10.

The liquid may be one of the following: activated sludges, industrial or urban waste effluents, "process" water, sea water, concentrated sludges.

The system described above can be included either within an enclosed or open biological or/and chemical reactor which may or may not operate under pressure, coupled with physico-chemical separation processes (settling tank, flotation agent, membranes, filters etc.)

or within an enclosed biological and/or chemical reactor operating under pressure with control of the gas content within the gaseous headspace by way of a vent.

In the case of deep basins (with a water height of greater than around 7 meters) or stations already kitted out, the system can operate with air or oxygen type basin bottom transfer systems such as "Ventoxal".

The device according to the invention has the following advantages:

suction of gas at low pressure (from 0.7 bar absolute) allowing suction of atmospheric air or the use of oxygen produced on site with no recompression step or originating from other steps or processes of the site using gases, limiting of the problems of pH reduction attributable to the reinjection of $CO_2$ produced by bacteria, the recouping mobile assembly (4) whose power is tailored to the requirements, possesses a wide radius of action and enables the gas/liquid mixture to be propelled to the bottom of the basin whilst achieving satisfactory levels of agitation, even for considerable depths of water (around 7 to 10 meters), possibility of decoupling the agitation and the injection of gas, thus allowing the various modes of running set forth earlier (continuous and alternating/sequenced operation).

As compared with the Ventoxal system, the system according to the invention has the advantages of enabling gas to be injected at atmospheric or slightly lower pressure, and of increasing the transfer efficiencies by at least 10% to 50% depending on the water height and the gas flow rate.

The system can be equipped with one or more axial-flow mobile assemblies such as propellers mounted coaxially on the shaft 2.

What is claimed is:

1. A device useful for agitating a liquid in a container and for injecting a gas into this liquid, comprising:

a drive device arranged above the container, the drive device provided with a vertical output shaft having a lower end, the drive device including at the output shaft lower end at least one axial-flow mobile assembly to be immersed in the liquid;

a cylinder having an upper end and a lower end, the cylinder upper end linked to the drive device in a leakproof manner;

wherein the output shaft of the drive device includes an autosuction turbine immersed in the container and drivable by the output shaft, the output shaft being enveloped coaxially by the cylinder and delimiting an annular gap between the output shaft and the cylinder, the lower end of the cylinder opening out into the turbine;

wherein the upper end of the cylinder includes an aperture for injecting a gas into the annular gap delimited by the shaft and the cylinder;

wherein the turbine comprises two superposed discs and a set of radial vanes arranged between the discs and fixed to them, one of the two superposed discs being an upper disc including a central hole into which penetrates the lower end of the cylinder, the lower end of the cylinder together with the edge of the said hole delimiting an at least partially annular space through which liquid can be sucked into the turbine.

2. A device according to claim 1, comprising means for directing towards the axial-flow mobile assembly a gas/liquid dispersion expelled radially by the turbine.

3. A device according to claim 2, wherein the means for directing comprises:

an annular box forming a deflector, enveloping the turbine and profiled so as to direct towards the axial-flow mobile assembly a stream issuing radially from the turbine, a central aperture formed in the lower face of the annular box; and substantially vertical plates forming counter-blades arranged radially and fixed to the deflector.

4. A device according to claim 3, wherein the means for deflecting further comprises an additional agitation mobile assembly.

5. A device according to claim 3, wherein the counter-blades are at least two in number and extend vertically from a level corresponding substantially to that of the surface of the liquid over a total height of between around 0.7 times and 12 times the diameter of the turbine.

6. A device according to claim 1, wherein the axial-flow mobile assembly is a propeller.

7. A device according to claim 4, wherein the counter-blades are at least two in number and extend vertically from a level corresponding substantially to that of the surface of the liquid over a total height of between around 0.7 times and 12 times the diameter of the turbine.

8. A device according to claim 2, wherein the axial-flow mobile assembly is a propeller.

9. A device according to claim 3, wherein the axial-flow mobile assembly is a propeller.

10. A device according to claim 9, further comprising radial notches cut into the counterblades so as to allow the blades of the propeller to penetrate therein.

11. A device according to claim 4, wherein the axial-flow mobile assembly is a propeller.

12. A device according to claim 5, wherein the axial-flow mobile assembly is a propeller.

* * * * *